United States Patent
Ernst et al.

(10) Patent No.: US 10,919,085 B2
(45) Date of Patent: Feb. 16, 2021

(54) MOLD MATERIAL MIXTURE CONTAINING ADDITIVES FOR REDUCING CASTING DEFECTS

(71) Applicant: ASK Chemicals GmbH, Hilden (DE)

(72) Inventors: Ingrid Ernst, Velbert (DE); Christian Priebe, Wülfrath (DE); Michael Richters, Essen (DE)

(73) Assignee: ASK Chemicals GmbH, Hilden (DE)

( * ) Notice: Subject to any disclaimer, the term of this patent is extended or adjusted under 35 U.S.C. 154(b) by 0 days.

(21) Appl. No.: 16/498,075

(22) PCT Filed: Mar. 28, 2018

(86) PCT No.: PCT/DE2018/100290
§ 371 (c)(1),
(2) Date: Sep. 26, 2019

(87) PCT Pub. No.: WO2018/177480
PCT Pub. Date: Oct. 4, 2018

(65) Prior Publication Data
US 2020/0101522 A1    Apr. 2, 2020

(30) Foreign Application Priority Data
Mar. 28, 2017 (DE) .......... 10 2017 106 686

(51) Int. Cl.
*B22C 1/16* (2006.01)
*B22C 9/10* (2006.01)
(Continued)

(52) U.S. Cl.
CPC .......... *B22C 1/162* (2013.01); *B22C 9/10* (2013.01); *C04B 35/14* (2013.01); *C04B 35/63456* (2013.01); *C04B 35/63488* (2013.01); *C04B 35/63492* (2013.01); *C04B 2235/3418* (2013.01); *C04B 2235/48* (2013.01); *C04B 2235/5436* (2013.01); *C04B 2235/9676* (2013.01)

(58) Field of Classification Search
CPC .......... B22C 1/00; B22C 1/102; B22C 1/162; B22C 1/167; B22C 1/186; B22C 1/2233; B22C 1/224; B22C 1/2246; B22C 1/2253; B22C 1/226; B22C 1/2273; B22C 9/02; B22C 9/10
See application file for complete search history.

(56) References Cited

U.S. PATENT DOCUMENTS

2,454,283 A    11/1948  King
2,556,335 A     6/1951  Moser
(Continued)

FOREIGN PATENT DOCUMENTS

DE           4327292 A1    2/1995
DE      102013004663 A1    9/2014
(Continued)

*Primary Examiner* — Kevin E Yoon
(74) *Attorney, Agent, or Firm* — Standley Law Group LLP

(57) ABSTRACT

The subject matter of the invention is mold material mixtures for producing molds or cores for metal casting, consisting of at least one refractory base mold material, a binder and an additive based on factice. The invention also relates to a component system, a method for producing molds and cores using the mold material mixtures or the component system respectively, and to molds and cores produced by said method.

23 Claims, 1 Drawing Sheet

Step 7
25 - 23 mm

Step 6
43 - 42 mm

Step 5
58 - 57 mm

Step 4
76 - 75 mm

Step 3
92 - 91 mm

Step 2
110 - 109 mm

Step 1
128 - 126 mm

Step 0
150 - 148 mm

(51) Int. Cl.
*C04B 35/14* (2006.01)
*C04B 35/634* (2006.01)

(56) References Cited

U.S. PATENT DOCUMENTS

| | | |
|---|---|---|
| 3,645,942 A | 2/1972 | Brown et al. |
| 3,978,906 A | 9/1976 | Lemon |
| 4,268,425 A | 5/1981 | Gardikes |
| 4,524,182 A | 6/1985 | Bauer et al. |
| 2010/0224755 A1 | 9/2010 | Stötzel et al. |
| 2010/0224756 A1 | 9/2010 | Muller et al. |
| 2011/0036528 A1 | 2/2011 | Goebbert et al. |

FOREIGN PATENT DOCUMENTS

| | | |
|---|---|---|
| EP | 2570451 A1 | 3/2013 |
| JP | 2011056518 A | 3/2011 |

Step 7
25 - 23 mm

Step 6
43 - 42 mm

Step 5
58 - 57 mm

Step 4
76 - 75 mm

Step 3
92 - 91 mm

Step 2
110 - 109 mm

Step 1
128 - 126 mm

Step 0
150 - 148 mm

MOLD MATERIAL MIXTURE CONTAINING ADDITIVES FOR REDUCING CASTING DEFECTS

The invention relates to mold material mixtures for producing molds or cores for metal casting, consisting of at least one refractory base mold material, a binder and an additive based on factice. The invention also relates to a component system comprised of refractory mold base material, binder and factice, to a method for producing molds and cores using the mold material mixtures or the component system respectively, and to molds and cores produced by said method.

BACKGROUND OF THE INVENTION

Casting molds are essentially comprised of molds or molds and cores which represent the negative form of the cast piece to be produced. The molds and cores here generally consist of a refractory mold base material, such as quartz sand, and a suitable binder which provides the cast mold with sufficient mechanical strength after removal from the mold tool. The refractory mold base material is preferably present in free-flowing form, so that after mixing with the binder it can be poured into a suitable hollow mold, compressed and then cured.

During casting, molds form the outer wall for the cast piece; cores are used to create hollow spaces within the cast piece. Here it is not absolutely essential that molds and cores consist of the same material. Thus, for example, in permanent mold casting, shaping the outer part of the cast pieces is done with the aid of permanent metal molds. A combination of molds and cores which were produced from mold material mixtures of different compositions by various methods is also possible.

If for the sake of simplicity below, only cores are mentioned, the statements also apply in equal measure to molds which are based on a same mold material mixture and were produced by the same method, and vice versa. The mold(s) and possible cores are put together in a core package and subsequently cast with liquid metal such as iron, steel, aluminum, bronze or other nonferrous metals.

The liquid metal then fills the hollow spaces, thus forming the desired casting. The high temperatures of the liquid metal, in particular, for example, with cast iron (casting temperatures between about 1300° C. and 1500° C.) or cast steel (casting temperatures between about 1500° C. and 1700° C.) lead to decomposition of the organic binder and heat the core.

Quartz sand expands with the increase in temperature due to heat expansion until at 573° C. a change of form takes place from alpha- to beta-quartz, also known as quartz inversion, which brings with it a sudden increase in volume. A further change of form for the quartz sand takes place at 1470° C. from beta-quartz to (alpha) cristobalite, which is also accompanied by an increase in volume. However, this change of form depends not only on the phase change temperature, but also depends heavily on other parameters such as grain size or the temperature/time gradient.

These changes of volume are responsible for mechanical stresses in the microstructure of the sand near to the boundary surface between the molten metal and sand, which can lead to cracks in the molds/cores, which enable the penetration of molten metal into the molds/cores and thus veins arise at the surface of the casting.

Veins are irregular, filigree, thin metallic protrusions which are difficult to remove, particularly in angles or on corners and edges of the cast pieces. They occur more readily with the use of chemically strengthened mold materials at the inner contours (the cores) of the castings and form through cracks on the surface of the molded part into which the liquid metal can penetrate. These veins are undesirable and must be removed with great time and effort, associated with increased costs. In critical applications with narrow passages, veins can seal said passages. Veins are difficult to detect at these places and often cannot be removed.

Other types of sand—referred to as special sands, such as chrome ore sand, olivine, fireclay sand, bauxite sand or even specially produced sands—can also be used to produce molds and cores.

These exhibit no phase transformation between 20° C. and 1700° C., less heat expansion and a tendency for significantly fewer vein defects. However, they are also significantly more expensive. The use of sand additives in the sand mixture is known for avoiding or reducing vein defects. Four different types of anti-veining additives are known from the prior art, which differ in their modes of action:

The first type is anti-veining additives which reduce the heat expansion of the quartz sand/additive mixture by their own low heat expansion compared with the pure sand mixture. These additives are also designated as sand replacements and are added in quantities from 10 to 100 weight percent with reference to the mold material mixture. These include, for example, aluminum silicates such as mullite beads or so-called microspheres.

The second type of anti-veining additive is comprised of so-called "fluxing agents". These fluxing agents either react with the surface of the sand and form new minerals, such as fayalite after addition of iron oxide, which reduces stresses in the sand microstructure due to significantly lower expansion, or form viscous phases themselves or in conjunction with other materials. These viscous phases give the microstructure of the sand a certain elasticity, which contributes to the prevention of veins, and they can seal pores on the boundary surface against liquid metal, so penetration of the metal into the sand microstructure becomes more difficult and surface defects of the cast piece can also be avoided. Quantities of these additives to be used lie between 1 and 15 weight percent, preferably between 2 and 10 weight percent and particularly preferably 2 to 8 weight percent.

The third type of anti-veining additive is comprised of organic materials which are mixed with the quartz sand and function as placeholders. These materials incinerate almost without a trace by 500° C. during the heating of the sand during the pouring of the molten metal, leave space and provide the quartz sand more room for heat expansion. This reduces the mechanical stress in the sand microstructure and thus also the tendency toward veining. This type of additive particularly includes sawdusts, dextrins and starches. Here, the quantity to add is between 0.5 and 8 weight percent, preferably between 0.5 and 6 weight percent and particularly preferably between 0.5 and 5 weight percent.

Coal dust or graphite can also be used as an anti-veining additive (the fourth type of anti-veining additive), but cannot be clearly classified as one of the three types already mentioned. Although coal or graphite also function in a certain manner as a placeholder, the main mode of action for these materials is somewhat different. During the incineration or pyrolysis of coal or graphite, a reducing atmosphere is produced in the pore space, which enables the excess carbon to be deposited as anthracite on the surface of the sand grains. This thin layer of carbon makes it more difficult for the molten metal to wet the sand grains and inhibits penetration of the liquid metal into the sand microstructure. Here, the quantity to add is between 0.01 and 10 weight percent, preferably between 0.02 and 5 weight percent and particularly preferably between 0.02 and 3 weight percent.

For sodium silicate-bonded molds, the addition of organic additives to the mold material mixture is known for improving the surface of the casting, but not in association with vein defects. Suitable organic additives are, for example, phenol formaldehyde resins such as novolaks, epoxide resins such as bisphenol A/epoxide resins, bisphenol F/epoxide resins or epoxidized novolaks, polyols such as polyethylene or polypropylene glycols, glycerin or polyglycerin, polyolefins such as polyethylene or polypropylene, copolymers from olefins such as ethylene and/or propylene with other co-monomers such as vinyl acetate or styrene and/or diene monomers such as butadiene, polyamides such as polyamide-6, polyamide-12 or polyamide-6,6, natural resins such as gum rosin, fatty acid esters such as cetyl palmitate, fatty acid amides such as ethylene diamine bis-stearamide, metal soaps such as stearates or oleates of di- or trivalent metals and carbohydrates such as dextrins. Suitable carbohydrates are described in WO 2008/046651 A1. The organic additives can be used as a pure material, or in a mixture with various other organic and/or inorganic compounds. The organic additives are preferably applied in a quantity from 0.01 weight percent to 1.5 weight percent, particularly preferably 0.05 weight percent to 1.3 weight percent and most particularly preferably 0.1 weight percent to 1 weight percent, in each case with reference to the mold material.

Styrene polymers with sizing agents for improving the surface quality are also proposed, cf. WO 2008135247 A1.

Typical industrial release agents are disclosed in EP 2244870 B1, for example. These are generally either (coalesced) silicone films which are applied to the inner contour surfaces of the tool either as solutions or emulsions, or a cured release lacquer. It is assumed that the release effect of such films is determined by their wetting properties with respect to the components in the mold material mixture.

Task of the Invention

Despite the great number of possible additives, the difficulty of "veins" is not resolved for all application scenarios. To achieve the desired effect, the prevention of veins, greater quantities of additive must often be applied. This frequently adversely affects other important properties, such as the strengths of the molds and cores or the processing time of the mold material mixtures. Sometimes other casting defects also occur.

The use of additives can also lead to undesired contamination in the tool, for example by red ferric oxide. Such contamination then frequently leads to an increased tendency of adhesion and makes more frequent cleaning of the core box necessary.

The inventors have made it their objective to provide new additives which can be used in all customary core production processes and which are already effective in relatively low quantities and (additionally as well as solely) reduce the tendency of adhesion in the core box.

SUMMARY OF THE INVENTION

The subject matter of the invention is a mold material mixture comprised of refractory mold base material, binder and factice, a use of factice and a method according to the independent claims. Advantageous embodiments are the subject matter of the dependent claims or are described below.

Surprisingly, it was found that a portion of factice in the mold material mixture considerably reduces the veining tendency, in particular in the casting of iron and steel. It was further surprising to find that the tendency of adhesion on the mold tool is reduced by the use of factice. This has the advantage that fewer sand adhesions remain in the mold tools, such as a core shooter, and thus the frequency of cleaning is reduced, which leads to less time lost and therefore to cost savings.

Factice, also known under the designation oil rubber, is a term referring to crosslinked, unsaturated esters, in particular fatty oils such as unsaturated vegetable oils like rapeseed, castor bean, linseed, soy, hemp, jatropha, cashew shell, peanut, rapeseed or fish oil. It is characteristic in each case that cross-linked, fatty oils are triglycerides which each have at least two, preferably three ester groups, with at least two, especially three of the ester groups each having at least one double bond prior to the cross-linking reaction. Suitable unsaturated esters for starting materials include partially hydrogenated triglycerides or unsaturated synthetic fatty acid esters. Thus, factice is a solid at ambient temperature (25° C.), which can be produced by the action of one or more cross-linking agents on unsaturated esters or ester groups, in particular a rubber-like material. After cross-linking, the converted esters form a three-dimensional network polymerization product. Mixtures of different factices with each other are also possible. Factice is soluble neither in the binder used nor in the polyol component of the binder used. According to a preferred embodiment, each molecule of factice comprises, on average, more than two cross-linked triglycerides.

Factice contains no oxirane groups and is thus not to be confused with epoxidized fatty acid esters in how these are used as a monomeric constituent for producing resins as binders or part of the binder (cf. for example DE 102013004663 A1 or DE 4327292 A1), as part of epoxide resins or alkyd resins, for instance. As a solid, factice can be disbursed in the binder, but is not itself the fluid binder.

The refractory mold base material comprises in particular more than 20 weight percent quartz sand with reference to the refractory mold base material used, particularly preferably more than 40 weight percent, and most preferably more than 60 weight percent quartz sand.

The inventive mold material mixtures comprise at least:
 a) a refractory mold base material,
 b) a binder and
 c) factice

DETAILED DESCRIPTION OF THE INVENTION

The refractory mold base materials are a suitable refractory mold base material or a mixture of multiple materials of this type, predominantly comprising quartz sand, whereby the quartz sand can be present as new sand or regenerated old sand or any mixture of the two. The inventive mold base materials used contain in particular more than 20 weight percent quartz sand with reference to the refractory mold base material, particularly preferably more than 40 weight percent, and most preferably more than 60 weight percent quartz sand.

Conventional, known materials and their mixtures can be used as a refractory mold base material for the production of casting molds. Suitable examples are quartz sand, zircon sand or chrome ore sand, olivine, vermiculite, bauxite, fireclay and socalled artificial mold base materials, i.e. mold base materials which were shaped spherically or approximately spherically (ellipsoidally, for example) by industrial processes of forming.

Examples of this are glass beads, glass granulate or artificial, spherical, ceramic sands—so-called Cerabeads®—as well as Spherichrome®, SphereOX® or "Carboaccucast" and hollow microspheres, such as hollow aluminum silicate spheres (so-called microspheres) which can be isolated as a component of fly ash among other things. Mixtures of the mold base materials mentioned are also possible.

A refractory mold base material is understood to be materials which have a high melting point (melting temperature). Preferably the melting point of the refractory mold base material or the components of the refractory mold base material respectively is greater than 600° C., preferably greater than 900° C., particularly preferably greater than 1200° C. and most preferably greater than 1500° C.

The refractory mold base material preferably comprises more than 70 weight percent, in particular more than 80 weight percent, particularly preferably more than 85 weight percent, of the mold material mixture.

The average diameter of the refractory mold base materials generally lies between 100 μm and 600 μm, preferably between 120 μm and 550 μm and particularly preferably between 150 μm and 500 μm. The particle size can be determined, for example, by sieving according to DIN ISO 3310. There is a particular preference for particle shapes with the greatest length linear extension to the smallest length linear extension (at a right angle with respect to one another in each case for all directions in space) having a ratio of 1:1 to 1:5 or 1:1 to 1:3, i.e. those which are, for example, not fibrous.

The refractory base material is preferably in a free-flowing state, in particular to be able to process the inventive mold material mixture in conventional core shooters.

Various inorganic and organic binder systems can be used as binding agents. The following methods and their associated binders can be cited as examples:

| | |
|---|---|
| PU cold box process | 2K binder comprised of a polyol (benzyl ether resin) and a polyisocyanate component, curing: gaseous tertiary amine |
| PU no-bake process | 2K binder comprised of a polyol (benzyl ether resin) and a polyisocyanate component, curing: liquid amine |
| Resol-$CO_2$ process | Highly alkaline phenol resols containing a boron compound, curing: $CO_2$ |
| Resol-ester process | highly alkaline resols Alphaset process, curing: liquid esters; Betaset process, curing: gaseous methyl formate |
| Hot-box process | resols, furan resins, urea resins or mixed resins, curing: latent acids plus the effect of heat |
| Warm-box process | furan resins, curing: latent acid plus the effect of heat |
| Inorg. hot-box process | binder based on silicate, curing: by the effect of heat or $CO_2$ |
| Croning process | novolaks, curing: hexamethylene triamine and curing: latent acids plus the effect of heat |
| No-bake process | resols, furan resins or mixed resins, acid curing |
| Epoxy $SO_2$ process | Mixture of epoxy resins and acrylates, sulfur dioxide addition for curing |
| ISOMAX ® | A mixture of cold-box epoxy-acrylate hybrid binder and epoxy $SO_2$ process, curing: gaseous tertiary amine (for example, according to U.S. Pat. No. 5,880,175) |

It is preferred that binders like these be used in the PU cold-box or epoxy $SO_2$ process. These are, on one hand, a polyol compound (especially benzyl ether resins) and polyisocyanates as a binder and tertiary amines as curing agents, and on the other hand mixtures containing at least epoxy resins and acrylates which are cured by the addition of sulfur dioxide or hybrid binder systems with amine gas curing derived therefrom.

The binders are added to the mold base material, and the mold material mixtures may contain further veining additives.

Any of the aforementioned binding agents can be used as a binder in a quantity of approximately 0.4 weight percent to approximately 7 weight percent, preferably from approximately 0.5 weight percent to approximately 6 weight percent and particularly preferably from approximately 0.5 weight percent to approximately 5 weight percent, with reference in each case to the mold material mixture.

To produce the mold material mixture, the components of the binder system can first be combined and then added to the refractory mold base material. However, it is also possible to add the components of the binder to the refractory mold base material at the same time or sequentially in any order. Conventional methods can be used to achieve a uniform mixture of the components in the mold material mixture.

The inventive additives or the inventive mold material mixture respectively contain one or more representatives from the group of substances known by the designation "factice" as a component.

Factice is a colorless, yellow or brown rubber-like substance which can be produced by the action of a cross-linking agent such as sulfur chloride or sulfur (sulfur factices) or oxygen (from air) with heat (oxygen factices), epoxides or oxiranes (epoxide factices), silicon tetrachloride (silicon factices) or diisocyanates (isocyanate factices) on unsaturated fatty acid esters such as fatty oils.

Preferred esters are natural triglycerides of unsaturated fatty acids, known as fatty oils. Examples of suitable fatty oils are colza oil, rapeseed oil, castor oils, tall oil, oils from blubber, linseed oil, soy oil, jatropha oil and fish oil as well as partially hydrogenated triglycerides and unsaturated synthetic fatty acid esters or mixtures thereof respectively.

Factices are solids and are provided either as powders or as aqueous or solvent-based dispersions, and are used this way as additives in paints and lacquers to improve the haptic properties such as a feeling of softness or nonslippage. Furthermore, factice functions as a filler in elastomeric components, such as treads, rollers or erasers (cf. EP 2570451 B1). In the present case, powders are used preferably.

According to one method for producing factice, fatty oils are converted at approximately 120° C. to 170° C. with 5 to 20 weight percent sulfur or at 20 to 70° C. with disulfur dichloride. Polysulfur compounds form in the process, but a portion of the sulfur remains free. Furthermore, there are types of factice in which the cross-linking of the double bonds does not take place with sulfur, but instead with peroxides via radicals. The powders can be obtained by grinding, for example. The particles tend to agglomerate.

Epoxide factices are obtained according to the manufacturing process known from EP 0121699 A1. In this, unsaturated esters are first epoxidized and then converted with curing agents for cross-linking.

The epoxidized and subsequently cross-linked esters are obtained by first epoxidizing the unsaturated esters (such as the fatty oils) and then cross-linking by means of suitable multifunctional cross-linking agents which react with epoxide groups, such as polycarboxylic acids, polyamines, polyhydroxy compounds or polythiol compounds. Suitable di- or polycarboxylic acids are, for example, succinic acid, phthalic acid, terephthalic acid, isophthalic acid and trimellitic acid. Suitable polyamines are, for example, ethylene diamine, diethylene triamine, hexamethylene diamine and phenylenediamines. Suitable polyhydroxy compounds are, for example, glycerin, glycol, diglycol, pentaerythritol, hydroquinone, pyrogallol and hydroxycarboxylic acids esterified with polyalcohols. Suitable polythiol compounds are, for example, ethanethiol-1,2-trimethylolpropane-tri-3-mercaptopropionate, pentaerythritol tetra(3-mercaptopropionate) and dithiophosphoric acids. Suitable cross-linking agents can also contain various functional groups in a single molecule. Suitable alcohols which are at least divalent, preferably trivalent are, for example, glycerin, glycol, pentaerythritol, trimethylolpropane and/or sorbitol. Preferred esters are the natural triglycerides of unsaturated fatty acids, the aforementioned so-called "fatty oil". Production details can be seen in EP 0121699 A1.

The factices used cannot be melted nor dissolved; thermal decomposition occurs upon heating for a longer time. The molecular weight can be between approximately 30,000 g/mol and 150,000 g/mol, preferably between 30,000 and 80,000 g/mol, most preferably 30,000 to 50,000 g/mol (in each case number averaged molecular weight).

The total sulfur content (including the S-bridges) in the inventively used factice lies between 0 and approximately 20 weight percent, preferably between 0 and approximately 10 weight percent, particularly preferably between 0 and approximately 5 weight percent and most preferably between 0 and 0.2 weight percent with reference to the factice.

According to another definition, the total sulfur content (including the S-bridges) amounts to between 0 and approximately 5 weight percent, preferably between 0 and approximately 3 weight percent, particularly preferably between 0 and approximately 2 weight percent and most preferably between 0 and 0.5 weight percent, in each case with reference to the mold material mixture.

With regard to the particle size, factices with an average diameter of approximately 30 to approximately 600 μm are particularly suited for use as sand additives, preferably from approximately 60 to approximately 300 μm and particularly preferably from approximately 80 to approximately 200 μm (measured with a Horiba LA-950 from Retsch Technology, based on the static laser light scattering according to DIN ISO 13320, measured in isopropanol, 290 ml flow cell, transmission R 80% to 88%, transmission B 85% to 90% with circulation and stirring, one minute ultrasound prior to measurement at level 3 of 7 with a probe of 130 W, 28 kHz).

The inventive anti-veining additive contains factice or mixtures of factice together. Factice can also be used as an anti-veining additive by itself regardless of whether it is available as a powder or dispersion. The use of factice as a powder is preferred.

According to the invention, the quantity of factice to be added by itself is between approximately 0.01 and 8 weight percent, preferably between approximately 0.05 and 5 weight percent or between approximately 0.04 and 5 weight percent, particularly preferably between 0.1 and 3 weight percent and most particularly preferably more than 0.2 and less than 1.5 weight percent. The quantities indicated refer to factice with reference to the mold material mixture.

According to the invention, the quantity of factice to be added with reference to the mold base material is between approximately 0.01 and 8 weight percent, preferably between approximately 0.05 and 5 weight percent, particularly preferably between 0.1 and 3 weight percent and most particularly preferably more than 0.2 and less than 1.5 weight percent.

In a further embodiment, at least one additional anti-veining additive (referred to only as an additive in the claims) can be added to the factice from one of the four anti-veining additive types initially mentioned, doing so in a quantity of 1 to 98 weight percent, preferably of 1 to 95 weight percent with reference to the total quantity of anti-veining additive used.

The ratio between factice and additional veining additive(s) comprises 1:100 to 100:1, preferably 1:90 to 90:1 and particularly preferably 1:10 to 1:1. Preferably, addition of inorganic anti-veining additive(s) occurs, particularly preferably aluminosilicates and oxides, most preferably spodumene, alkaline and alkaline earth feldspars and oxides of iron, aluminum, titanium and manganese.

Possible additional anti-veining additives to prevent veining comprise, for example, minerals, hollow microspheres, sawdust, organic fiber material, carbohydrates, carbon, natural oils, mineral oils, waxes, natural resins and synthetic resins, etc. Suitable minerals are, for example, SphereOX®, $TiO_2$, iron oxide, mica, a-spodumene, pspodumene and vermiculite. Examples of hollow microspheres are those aluminum silicate or borosilicate glass hollow microspheres marketed as "Extendospheres" or "Q-Cele" respectively. A suitable sawdust is, for example, beech wood sawdust. Polyethylene fibers can be used, for example, as organic fiber material and starches as carbohydrate. If carbon is used as an additive component, then this can be in the form of coke and/or graphite, both expanded and unexpanded, and/or bituminous coal dust. Castor oil and linseed oil are suited as natural oils, and kerosene as a mineral oil. Waxes to be considered are, for example, polyethylene wax and Vaseline. Gum rosin is an example of a suitable natural resin component, while phenolic resins in solution or powder form or polyols (glycerin) can be used as synthetic resins.

Particularly suitable further additional anti-veining additives are
   at least one aluminosilicate, in particular in quantities from 1 to 15 weight percent, particularly preferably from 1 to 10 weight percent;
   an iron oxide, in particular in quantities from 1 to 15 weight percent, particularly preferably from 1 to 8 weight percent;
   sawdusts, in particular in quantities from 0.3 to 5 weight percent, particularly preferably from 0.3 to 3 weight percent; and/or
   dextrins and starches, in particular between 0.5 and 5 weight percent, preferably between 0.5 and 4 weight percent, particularly preferably from 0.5 to 3 weight percent,
   with reference in each case to the mold material mixture.

According to the invention, factice, as described above, can be used by itself or in combination with conventional additives.

In the case of the use of two or more anti-veining additives, factice can be added to the mold material mixture separately, at the same time as the other components or pre-mixed with them.

Preferably, the additive or additive components are pre-mixed with the refractory mold base materials and then mixed with the binder, but the sequence of addition can also be changed and the additive introduced, for example, at the end. After thorough mixing of the inventive mold material mixtures, they are transferred to a mold tool, cured there according to the particular method applied and the molds and cores thus obtained are then removed from the tool.

The mold material mixture is compacted in a core shooter using compressed air in order to constitute the desired dimensions of the mold or core respectively.

Experimental part

If not otherwise specified, the following percentage values or the indication of PBW (parts by weight) refer to the quantity of refractory mold base material used and the weight (=100 PBW).

The drawings found in the appendix illustrate the geometry of the test specimen molds.

EXAMPLE OF A VEINING TEST WITH THE CASTING OF A STEP CORE

Figure 1:
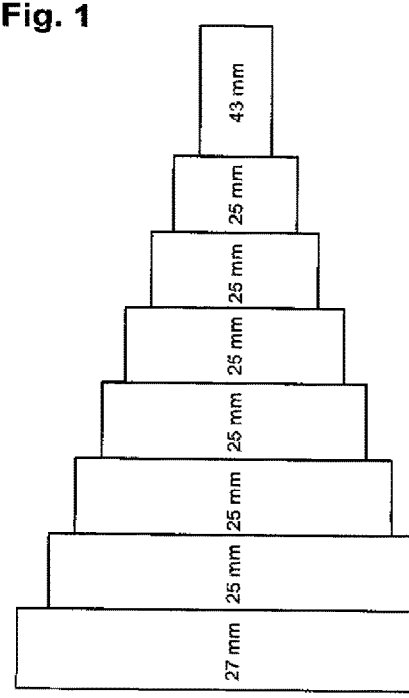
FIG. 1 shows a side view of the step core produced, specifying the step height in millimeters within the figure and the outer diameter of the steps to the right thereof (first value=diameter of the step below, second value=diameter of the step above).
Figure 2:
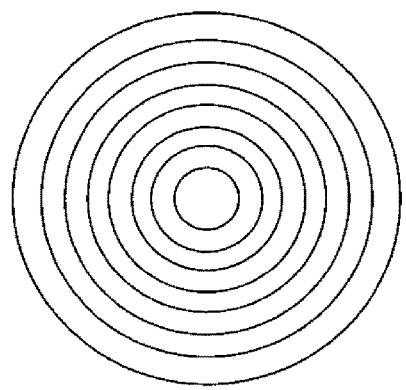
FIG. 2 is the step core shown from above.
Figure 3:
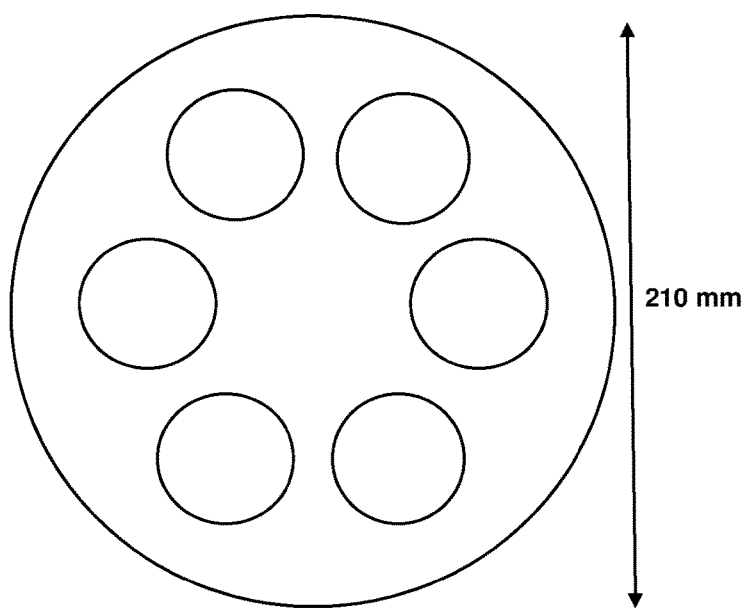
FIG. 3 shows a top view of a base with multiple dome cores.
Figure 4:
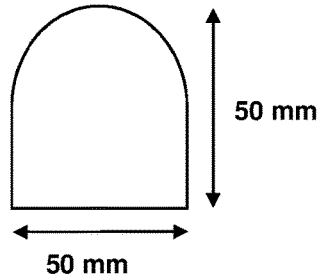
FIG. 4 shows a section through one of the dome cores with a round top surface.

The influence of factice on the veining tendency was studied with the aid of so-called step cores. Step cores were produced for this using the cold-box process and a core shooter.

The mold material mixture comprised of
 100 PBW quartz sand H 32 from the Haltern pit
 0.8 PBW ECOCUREO R 300 WM 10
 0.8 PBW ECOCUREO R 600 WM 11
 and an additive as per Table 1 was produced homogeneously using a mixer from the firm Hobart (mixing time for each component 1 minute, total weight of the mixture 5 kg) and introduced to the mold tool using compressed air (4 bar) and then 2.0 ml of CATALYST 706 (ASK Chemicals GmbH, dimethyl propylamine) was added as a gas for 20 seconds at 2 bar purging pressure for curing. Then the step cores were cemented into the cast mold in such a way that they hung upside down (with the narrow side downward) and during the pour were filled slowly from bottom to top with molten metal.

Pouring took place with molten gray cast iron GGJL at a casting temperature of about 1410° C., at a pouring height of 55 cm and a pouring time of about 12 seconds. The cast weight comprised about 12 kg, and the sand to iron ratio at Step 1 (diameter 128-126 mm) was about 1:3 and at Step 7 (diameter 25-23 millimeters) about 1:30. After the casting mold cooled, the cast pieces of the mold were removed and sand-blasted to remove sand sticking to them. Then the cast pieces were evaluated for veining, cf. Table 1.

The following were used:
 ECOCUREO 300 WM 10: benzyl ether resin in esters
 ECOCUREO 600 WM 11: polymeric MDI in aromatic solvents
 ASKOCURE® 388: benzyl ether resin in aromatics and esters
 ASKOCURE® 688: polymeric MDI in aromatic solvents
 LIGNOCEL® HB 120: hardwood sawdust, particle size 40-120 μm
 DEOGRIP® WPF: peroxide-cross-linked, modified castor oil produced by D.O.G Deutsche Oelfabrik Ges.f.chem.Erz. mbH & Co.KG, Hamburg
 Factice RQ 20: sulfur factice based on castor oil. Total sulfur content: 17.5-20.5% produced by D.O.G Deutsche Oelfabrik Ges.f.chem.Erz. mbH & Co.KG, Hamburg
 Factice NQ: sulfur factice based on castor oil, total sulfur content: 11-14%, produced by D.O.G Deutsche Oelfabrik Ges.f.chem.Erz. mbH & Co.KG, Hamburg
 RHENOPREN® EPS: peroxide-cross-linked vegetable oil, produced by Rhein Chemie Additives, Cologne
 RHENOPREN® C: cured rapeseed oil cross-linked with sulfur, sulfur content: 16-18%, produced by Rhein Chemie Additives, Cologne
 SphereOX®: high-purity synthetic iron oxide, $Fe_2O_3$+ FeO content approximately 98%, produced by Chesapeake Specialty Products, Inc., Baltimore, Md. (USA)
 Graphite: silver powder graphite type GHL 285, Dominik Georg Luh Technografit GmbH The symbol (®) is used in each case to indicate registered trademarks at least for Germany and/or the USA for the corresponding owners. In the text below, the registered trademark symbol is no longer used for the sake of brevity, and in this respect, reference is made herewith to the table above.

The results in Table 1 show that even at lower quantities added, the tested factice types RQ 20 and NQ, DEOGRIP WPF and RHENOPREN EPS achieve a better effect against veining than the standard additive consisting of sawdust. It is suspected that factice functions not only according to the placeholder principal, but rather, like coal or graphite, deposits anthracite material on the grains of sand from the reducing atmosphere during combustion and thus makes wetting by molten metal more difficult.

Example of a Veining Test with the Pouring of a Dome Core

To assess the veining tendency, additional castings of dome cores were produced using various types of factice. For this, a mold material mixture (produced as described previously) of
 100 PBW quartz sand H 32 from the Haltern pit
 0.8 PBW ECOCURE 300 WM 10
 0.8 PBW ECOCURE 600 WM 11
 and an additive as per Table 2
were mixed and dome cores (h=50mm, d=50mm) produced.

To do so, the mold material mixture was introduced into a suitable mold tool using compressed air at 4 bar and cured for 20 seconds with 2.0 ml of CATALYST 706 (ASK Chemicals GmbH, DMPA) at 2 bar purging pressure. The mold was assembled by first cementing the dome cores onto the base of the hollow space of the main core and sealing the hollow space with the cover core. A circular opening with a diameter of 20 mm was provided in the cover core. Then the funnel-shaped cast-in core was attached on the cover core such that the funnel led to the filling port of the cover core. Gravity casting was the process used. The casting temperature was about 1410 to 1430° C. The pouring time was about 10 seconds and the cast weight about 15 kg.

The results were evaluated with regard to veining here as well and are summarized in Table 2.

Once again, compared to the standard additive sawdust, it was shown in this test as well that use of factice achieved a cleaner casting surface than with a standard additive and did so in fact regardless of whether a factice containing sulfur or one with no sulfur was used.

The flexural strength of these mixtures was also measured and found to be sufficiently good.

Determination of the Adhesion Tendency

Another important criterion for the use of a sand additive is the so-called adhesion tendency on the interior walls of the core tool. This is understood to be the tendency of an additive to promote sand adhesions on the walls of the tool when shooting cores. A lot of sand adhesions in the tool result in increased effort for cleaning and thus higher costs.

The following procedure was used to determine the adhesion tendency. A sand mixture comprised of quartz sand H 32, additive (as specified in Tables 3 and 4), 0.80% ECOCURE 300 WM 10 and 0.80% ECOCURE 600 WM 11 were mixed homogeneously in a mixer from the firm Hobart (production of the mold material mixture as described previously).

This sand mixture was transferred to the core shooter, and a core was produced with a dimension (L×W×H) of 11 cm×5 cm×1.2 cm with a shooting pressure of 4 bar using compressed air in a shooting mold. The shooting mold was made of steel and prior to first use degreased with acetone and not treated with an external mold release agent. The core shot into the mold was cured using CATALYST 706 (dimethyl propylamine) (1 ml, gas treatment time 10 seconds at 2 bar purging pressure). After curing, the core was removed from the mold. This procedure was repeated 20 times altogether with the same sand mixture without cleaning the metal mold during the process or treating it with an external release agent. After the 20 shooting procedures, the shooting mold was removed and the sand adhesions which formed (directly under the two injection nozzles) were removed mechanically and weighed. The quantity of sand adhesions in milligrams (Table 3 and 4) is a measure of the adhesion tendency of the sand mixture tested.

A sand mixture with 1.8% SphereOx and 0.2% factice was tested and compared to a sand mixture with 2% SphereOX, in each case with reference to the mold base material. The quantities of binder (in the cold-box system) were selected such that the strengths of the test specimens produced with the mixtures were approximately the same. After shooting 20 cores, the quantity of sand adhering on the tool was more than 40% lower with the mold material mixture containing factice compared to the mixture without factice.

It is known from practice that graphite has a very low adhesion tendency and is therefore also popular as an additive component in quantities from 5 to 20% with reference to the additive mixture. For this reason, a direct comparison was made between 5%, 10% and 15% co-mixture of factice and graphite respectively to SphereOX® in the test of adhesion tendency. These additive mixtures were added to the sand in quantities of 2% in each case with respect to the mold material mixture.

Tables 3 and 4 list the results of the adhesion tendency tests (average values after 20 shots). It can be seen in Tables 3 and 4 that the adhesion tendency, evaluated by the sand adhesion, is significantly less with mixtures containing factice compared to the mixtures containing graphite.

However, in the co-mixtures of lower concentration, the sand adhesions were more than 70% less with the cured mold material mixtures containing factice versus the graphite mixture.

The mold material mixtures in Tables 3 and 4 each contained the following additives or cold-box binders respectively, in each case relative to 100 PBW of refractory mold base material. This is quartz sand H 32 from the Haltern pit.

A3: 0.8 PBW ASKOCURE 388, 0.8 PBW ASKOCURE 688,

A4: 0.8 PBW ASKOCURE 388, 0.8 PBW ASKOCURE 688,
2 PBW SphereOX,

A5: 0.7 PBW ASKOCURE 388, 0.7 PBW ASKOCURE 688,
2 PBW SphereOX,

A6: 0.65 GWT ASKOCURE 388, 0.65 GWT ASKOCURE 688,
2 PBW SphereOX,

A7: 0.8 PBW ASKOCURE 388, 0.8 PBW ASKOCURE 688,
1.9 PBW SphereOX +0.1 PBW graphite, A8: 0.8 PBW ASKOCURE 388, 0.8 PBW ASKOCURE 688,
1.8 PBW SphereOX +0.2 PBW graphite, A9: 0.8 PBW ASKOCURE 388, 0.8 PBW ASKOCURE 688,
1.7 PBW SphereOX +0.3 PBW graphite, B8: 0.8 PBW ASKOCURE 388, 0.8 PBW ASKOCURE 688,
1.8 PBW SphereOX +0.2 PBW DEOGRIP WPF, B9: 0.8 PBW ASKOCURE 388, 0.8 PBW ASKOCURE 688,
1.9 PBW SphereOX +0.1 PBW DEOGRIP WPF, B10: 0.8 PBW ASKOCURE 388, 0.8 PBW ASKOCURE 688,
1.8 PBW SphereOX +0.2 PBW DEOGRIP WPF B11: 0.8 PBW ASKOCURE 388, 0.8 PBW ASKOCURE 688,
1.7 PBW SphereOX +0.3 PBW DEOGRIP WPF

TABLE 1

| | Mixture | Additive | Number of veins ||||||| 
| | | | Step 1 | Step 2 | Step 3 | Step 4 | Step 5 | Step 6 | Step 7 |
| --- | --- | --- | --- | --- | --- | --- | --- | --- | --- |
| Not according to the invention | A1 | none | 9 | 7 | 7 | 8 | 8 | metal pen. | metal pen. |
| | A2 | 0.8% LIGNOCEL HB 120 | 5 | 6 | 6 | 7 | metal pen. | metal pen. | metal pen. |
| According to the invention | B1 | 0.4% DEOGRIP WPF | 5 | 4 | 4 | 4 | 4 | metal pen. | metal pen. |
| | B2 | 0.8% DEOGRIP WPF | 4 | 4 | 4 | 4 | 4 | 4 | metal pen. |
| | B3 | 0.4% RHENOPREN EPS | 3 | 3 | 4 | 4 | 4 | 1 | metal pen. |
| | B4 | 0.8% RHENOPREN EPS | 2 | 2 | 4 | 4 | 4 | 2 | metal pen. |

Step 0: 150-148 mm, is cemented into the mold,
Step 1: 128-126 mm,
Step 7: 25-23 mm, cf. FIG. 1

TABLE 2

|  | Mixture | Additive | Number of veins | Vein height [mm] | Metal penetration |
|---|---|---|---|---|---|
| Not according to the invention | A1 | none | 3 | 5 | heavy |
|  | A2 | 0.8% LIGNOCEL HB 120 | 3 | 3 | heavy |
| According to the invention | B1 | 0.4% DEOGRIP WPF | 4 | 1.5 | light |
|  | B2 | 0.8% DEOGRIP WPF | 3 | 1 | light |
|  | B3 | 0.4% RHENOPREN EPS | 2 | 1 | light |
|  | B5 | 0.4% RHENOPREN C | 3 | 2 | heavy |
|  | B6 | 0.4% factice RQ 20 | 3 | 1 | heavy |
|  | B7 | 0.4% factice NO | 0 | 0 | moderate |

TABLE 3

|  | Not according to the invention | | | | According to the invention |
|---|---|---|---|---|---|
|  | A3 | A4 | A5 | A6 | B8 |
| Additive [PBW] | none | 2 S | 2 S | 2 S | 1.8 S + 0.2 F |
| Portion of binder [PBW:PBW] | 0.8:0.8 | 0.8:0.8 | 0.7:0.7 | 0.65:0.65 | 0.8:0.8 |
| Average Sand adhesion [mg] | 0.28 | 0.19 | 0.17 | 0.13 | 0.07 |

TABLE 4

|  | Not according to the invention | | | According to the invention | | |
|---|---|---|---|---|---|---|
|  | A7 | A8 | A9 | B9 | B10 | B11 |
| Additive [PBW] | 1.9S + 0.1G | 1.8S + 0.2G | 1.7S + 0.3G | 1.9S + 0.1F | 1.8S + 0.2F | 1.7S + 0.3F |
| Average Sand adhesion [mg] | 0.42 | 0.25 | 0.17 | 0.09 | 0.07 | 0.02 |

S = SphereOx
G = graphite
F = DEOGRIP WPF

The invention claimed is:

1. A mold material mixture comprising:
a refractory mold base material,
a binder and
provided separate from the binder, an additive comprising factice, in which the factice is present as a powder or dispersion, with the factice present in an amount from between 0.01 and 8 weight percent, with reference to the mold material mixture.

2. The mold material mixture according to claim 1, in which the factice is an unsaturated ester cross-linked via sulfur or oxygen or starting from oxirane/epoxide groups, preferably an unsaturated ester cross-linked via oxygen bridges.

3. The mold material mixture according to claim 1, wherein the factice has an average molecular weight (number average) between 30,000 g/mol and 150,000 g/mol, preferably between 30,000 and 80,000 g/mol, and in particular between 30,000 to 50,000 g/mol.

4. The mold material mixture according to claim 1, wherein the factice is added as a dry powder.

5. The mold material mixture according to claim 1, wherein the factice has a particle size with an average diameter of 30 to 600 μm, preferably from 60 to 300 μm, and particularly preferably from 80 to 200 μm.

6. The mold material mixture according to claim 1, wherein factice has a sulfur content between 0 and 20 weight percent, preferably between 0 and 10 weight percent, particularly preferably between 0 and 5 weight percent and most particularly preferably with no sulfur.

7. The mold material mixture according to claim 1, wherein at least one of the following conditions applies:
the factice is present, with reference to the mold material mixture, from between 0.05 and 5 weight percent, preferably from between 0.1 and 3 weight percent and particularly preferably from more than 0.2 and less than 1.5 weight percent; or
the factice is present, in each case with reference to the refractory mold base material, from between 0.01 and 8 weight percent, preferably from between 0.05 and 5 weight percent, particularly preferably from between 0.1 and 3 weight percent and most particularly preferably from more than 0.2 and less than 1.5 weight percent.

8. The mold material mixture according to claim 1, wherein the mold material mixture comprises a further additive to avoid veining, selected from one or more members of the following group: minerals, hollow microspheres, sawdust, organic fiber material, carbohydrates, carbon, natural oils, mineral oils, waxes, natural and synthetic resins, mica, vermiculite, aluminosilicates such as spodumene, aluminum oxides, alkaline and alkaline earth feldspars, oxides of iron, aluminum, titanium and manganese, particularly preferably selected from aluminosilicates such as spodumene, aluminum oxides, alkaline feldspars, alkaline earth feldspars, iron oxides, titanium oxides and manganese oxides and mixtures thereof.

9. The mold material mixture according to claim 8, wherein the weight ratio of factice to one or more of the additional additives comprises 1:100 to 100:1, preferably 1:10 to 1:1.

10. The mold material mixture according to claim 1, further comprising one or more of the following additional additives to avoid veining:
at least one aluminosilicate, in particular in quantities from 1 to 15 weight percent, particularly preferably from 1 to 10 weight percent;
an iron oxide, in particular in quantities from 1 to 15 weight percent, particularly preferably from 1 to 8 weight percent;

sawdusts, in particular in quantities from 0.3 to 5 weight percent, particularly preferably from 0.3 to 3 weight percent; and dextrins and starches, in particular between 0.5 and 5 weight percent, preferably between 0.5 and 4 weight percent, particularly preferably from 0.5 to 3 weight percent, with reference in each case to the mold material mixture.

11. The mold material mixture according to claim 1, wherein the binder is chosen from one or more of the following:

at least one polyol and one polyisocyanate, curable with a tertiary amine;

an alkaline phenol resol containing a boron compound curable by $CO_2$;

an alkaline resol, curable with an ester or methyl formate;

resols, furan resins, urea resins or mixed resins, thermally curable in each case;

binders based on silicate, curable thermally or with $CO_2$;

novolaks curable with hexamethylene triamine;

resols, furan resins or mixed resins, curable with acid in each case;

a mixture of epoxy resins and acrylates, curable with $SO_2$, wherein the binder preferably is selected from one or more of the following:

at least one polyol and one polyisocyanate, curable with a tertiary amine;

an alkaline phenol resol containing a boron compound curable by $CO_2$;

binders based on silicate, curable thermally or with $CO_2$; and mixtures of epoxy resins and acrylates, curable using $SO_2$;

and particularly preferably the binder comprises at least one polyol and a polyisocyanate curable with a tertiary amine.

12. The mold material mixture according to claim 1, wherein the mold material mixture comprises the binder, in each case with reference to the mold material mixture, from 0.4 weight percent to 7 weight percent, preferably from 0.5 weight percent to 6 weight percent and particularly preferably from approximately 0.5 weight percent to 5 weight percent.

13. The mold material mixture according to claim 1, wherein the refractory mold base material is selected from one or more of the following:

quartz sand, zircon sand or chrome ore sand, olivine, vermiculite, bauxite, fireclay, glass beads, glass granulate, hollow microspheres of aluminum silicate and mixtures thereof, wherein, independently thereof, the refractory mold base material consists of more than 20 weight percent of quartz sand with reference to the refractory mold base material.

14. The mold material mixture according to claim 1, wherein more than 70 weight percent, preferably greater than or equal to 80 weight percent and particularly preferably greater than or equal to 85 weight percent of the mold material mixture refractory mold base material.

15. The mold material mixture according to claim 1, wherein the refractory mold base material has average particle diameters between 100 μm and 600 μm, preferably between 120 μm and 550 μm, as determined by sieve analysis.

16. The mold material mixture according to claim 1, wherein the binder comprises at least one polyol and one polyisocyanate and the binder is curable with a tertiary amine.

17. A component system for producing mold material mixtures comprising the following components separate from one another:

Component A) containing or consisting of a refractory mold base material,

Component B) containing or consisting of a binder with a hardener/activator/catalyst, and Component C) comprising factice, in which the factice is used as a powder or dispersion and the mold material mixture comprises the factice from between 0.01 and 8 weight percent with reference to the mold material mixture.

18. The component system according to claim 17, in which the Component C) contains a further other additive to avoid veining, preferably at least one iron oxide in a weight ratio of the factice to iron oxide from 1:100 to 100:1, preferably from 1:10 to 1:1.

19. The component system according to claim 17 wherein the factice is an unsaturated ester cross-linked via sulfur or oxygen or starting from oxirane/epoxide groups, preferably an unsaturated ester cross-linked via oxygen bridges.

20. The component system according to claim 17, wherein the factice is added as a dry powder.

21. The component system according to claim 17, wherein the factice has a particle size with an average diameter of 30 to 600 μm, preferably from 60 to 300 μm, and particularly preferably from 80 to 200 μm.

22. A method for producing a core or mold, comprising the following steps:

introducing the mold material mixture according to claim 1, possibly containing further constituents, into a mold tool;

curing of the mold material mixture in the mold tool; and removing the cured core or mold from the mold tool.

23. A mold or core which obtainable by the method according to claim 22 for metal casting, particularly for casting iron and/or steel.

\* \* \* \* \*